United States Patent [19]

Eicke et al.

[11] 3,884,949

[45] May 20, 1975

[54] PROCESS FOR THE MANUFACTURE OF METAL COMPLEXES IN A PURE FORM

[75] Inventors: Hans Eicke, Reinach; Vladimir Arnold, Basel; Francois L'Eplattenier, Therwil, all of Switzerland

[73] Assignee: Ciba-Geigy Corporation, Ardsley, N.Y.

[22] Filed: Nov. 8, 1973

[21] Appl. No.: 413,993

[30] Foreign Application Priority Data
Nov. 22, 1972 Switzerland.................. 17010/72

[52] U.S. Cl........ 260/429.3; 260/429 R; 260/438.1; 260/439 R; 260/515 R; 260/515 A
[51] Int. Cl. .............................................. C07f 7/00
[58] Field of Search.............. 260/429.3, 429, 438.1, 260/439, 429 J, 515

[56] References Cited
UNITED STATES PATENTS
2,741,628  4/1956  Plucknett..................... 260/429.3

| | | |
|---|---|---|
| 3,189,630 | 6/1965 | Sonutny...................... 260/438.1 X |
| 3,196,128 | 7/1965 | Tazewell et al. ............. 260/439 RX |
| 3,297,586 | 1/1967 | Duck et al.................... 260/429 RX |
| 3,651,110 | 3/1972 | Ward ............................ 260/439 R |

OTHER PUBLICATIONS

Chem. Abstracts, Vol 71, 92286q (1969)
Chem. Abstracts, Vol 71, 8015v (1969)
Chem. Abstracts, Vol 66, 66445t (1967)
J.A.C.S. Vol. 82, No. 14, pp 3495–98(1960)
Chem. Abstracts, Vol. 54, 6382 c,d (1960)
Chem. Abstracts, Vol. 64, 16709d (1966)
Chem. Abstracts, Vol. 53, 18902f (1959)

*Primary Examiner*—H. Sneed
*Attorney, Agent, or Firm*—Nestor W. Shust; Luther A. R. Hall

[57] ABSTRACT

A new process for preparing metal complexes of unsubstituted or 3,5-substituted salicyclic acid and of 2-valent metals or 2-valent metal oxides of 4-valent metals comprising reacting a corresponding salicyclic acid with a soluble metal salt and an alkali alcoholate.

4 Claims, No Drawings

PROCESS FOR THE MANUFACTURE OF METAL COMPLEXES IN A PURE FORM

The present invention relates to a process for the manufacture of metal complexes of divalent metals or divalent radicals of oxo complexes of tetravalent metals with acids of the formula I

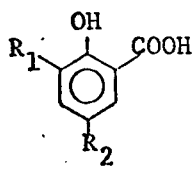

in which $R_1$ and $R_2$ independently of one another denote hydrogen, bromine, chlorine, alkyl, cycloalkyl or aralkyl, which is characterised in that a successive reaction is carried out, in a solvent, of
a. an acid of the formula I with
b. a salt of the formula II

in which M denotes the divalent cation of a divalent metal or of an oxo complex of a tetravalent metal, X denotes an anion which forms with M a salt which is soluble in the solvent of the process and p denotes 1 or 3 and m corresponds to the valency of the anion X, and
c. an alcoholate of the formula III M'OR (III)
in which M' denotes the cation of an alkali metal and R denotes lower alkyl, the methoxyethyl group or the ethoxyethyl group, a, b and c are employed in the molar ratio of (2-i): 1/p:2 and i denotes 1 or 0 and, in the case that i is 1, the reaction mixture is reacted with water, the molar ratio of water to the acid of the formula I being at least 1.

By metal complexes there are understood, in the present invention, either complexes a) of a divalent metal M or of a divalent oxo complex MO of a tetravalent metal M and anions of the acid of the formula I or complexes b) of a divalent metal M or of a divalent oxo complex MO of the tetravalent metal M, anions of the acid of the formula I and a hydroxyl group.

It is already known to manufacture metal complexes of divalent metals with the acids of the formula I. In these processes, the alcoholates of the divalent metals in question are reacted with the acids of the formula I. The manufacture in a pure form of the metal complexes of these divalent metals with the acids of the formula I was, by this method, only possible in a few cases. In most cases, only mixtures were obtained. It has now been found, surprisingly, that in the reaction of acids of the formula I with 1/p mols of salts of the formula II and subsequently with 2 mols of alkali metal alcoholates of the formula III pure metal complexes are obtained.

The process according to the invention is not only novel but also offers the technical advantage that it is not necessary to manufacture the alcoholates of the divalent metals. Since the new process, in contrast to known processes, is quite generally suitable for the preparation of the metal complexes of the formula I in a pure form, the process is advantageous for this reason also.

The metal complexes obtained according to the process of the invention are used as antistatic agents. The metal complexes manufactured for the first time in a pure form are more active than the previously known metal complexes.

In a preferred embodiment of the process according to the invention a reaction is carried out in a lower alcohol, a lower ether, a lower ether-alcohol, a lower ketone or dimethylformamide, of
a. an acid of the formula I with
b. a salt of the formula II

in which M denotes the divalent cation of Be, Ca, Sr, Ba, Mg, Mn, Fe, Co, Ni, Cu, VO or ZrO, X denotes the anion $Cl^-$, $Br^-$, $F^-$, $NO_3^-$, $SO_4^{--}$, $ClO_4^-$, $CH_3COO^-$, or $C_{17}H_{35}COO^-$ and m corresponds to the valency of the anion X, and
c. an alcoholate of the formula III

in which M' denotes the cation of an alkali metal and R denotes lower alkyl, the methoxyethyl group or the ethoxyethyl groups, a, b and c are employed in the molar ratio of (2-i) : 1:2 and i denotes 1 or 0 and, if i is 1, the reaction mixture is reacted with water, the molar ratio of water to the acid of the formula I being at least 1.

The acid of the formula I used in the process according to the invention can be substituted in position 3 and/or 5 by alkyl groups which contain, for example, a total of 1 to 10, preferably 1 to 8, carbon atoms, such as methyl, ethyl, n-propyl, iso-propyl, n-butyl, sec.-butyl, tert.butyl, pentyl, hexyl, octyl or decyl, by cycloalkyl groups which preferably contain 6 to 9 carbon atoms, such as cyclohexyl or 1-methylcyclohexyl, or by aralkyl groups with, preferably, 7 to 9 carbon atoms, such as benzyl, α-methylbenzyl or α,α-dimethylbenzyl.

Examples of salts of the formula II which are used are salts of the divalent metals Be, Ca, Sr, Ba, Mg, Mn, Fe, Co, Ni or Cu or of a divalent oxo complex of tetravalent metals such as VO or ZrO and of the acids HCl, HBr, HF, $HNO_3$, $H_2SO_4$, $HClO_4$, $CH_3COOH$ or $C_{17}H_{35}COOH$. Preferably, salts of the formula II of the acids HCl or $CH_3COOH$ are used according to the invention.

Amongst the alcoholates of the formula III, sodium alcoholates and potassium alcoholates are preferred. When the group R of the alcoholates of the formula III denotes lower alkyl, it can be lower alkyl with 1 to 4 carbon atoms, such as methyl, ethyl, propyl or butyl.

The solvents used in the process according to the invention can be lower alcohols, preferably with 1 to 4 carbon atoms, such as, for example, methanol, ethanol, iso-propanol, butanol or glycol; lower ethers, preferably with 2 to 6 carbon atoms, such as, for example open-chain ethers such as dimethyl ether, diethyl ether, di-isopropyl ether, 1,2-dimethoxyethane, diethylene glycol dimethyl ether or diethylene glycol monoethyl ether, or cyclic ethers such as tetrahydrofurane or dioxane; lower ether-alcohols with, preferably, 3 to 6 carbon atoms, such as, for example, methylcellosolve, ethylcellosolve or ethylcarbitol; or lower ketones with, preferably, 3 to 6 carbon atoms, such as, for example, acetone, methyl ethyl ketone, diethyl ketone or methylisopropyl ketone.

The preferred solvents of the process according to the invention are lower alcohols, and methanol and ethanol are particularly preferred. The process according to the invention is preferably carried out at temperatures below 110°C.

In the process according to the invention, after adding the salts of the formula II and the alcoholates of the formula III, water is added if the molar ratio of the acid of the formula I to the alcoholate of the formula III is not 1 but ½. The molar ratio of water to the acid of the formula III should be at least 1:1 in that case. However, as large an excess of water over this minimum amount as may be desired can also be used. The reaction with water produces monohydroxy complexes which consist of a cation of a metal M, an anion of an acid of the formula I and a hydroxyl group.

In the process according to the invention, the absolute concentration is not critical. The only limit imposed on it is that due to the solubility of the reactants.

The compounds which can be manufactured according to the invention are in some cases new. New metal complexes are the complexes which contain the divalent cation of Ba, Mg, Mn, VO or ZrO, such as, for example, $VO^{2+}$ (3,5-diisopropylsalicylate)$_2$
$VO^{2+}$ (3,5-diisopropylsalicylate)(OH)
$ZrO^{2+}$ (3,5-diisopropylsalicylate)$_2$
$ZrO^{2+}$ (3,5-diisopropylsalicylate)(OH) and
$Ni^{2+}$ (3,5-diisopropylsalicylate)(OH)

The compounds which can be manufactured according to the invention are used as antistatic agents for hydrocarbons such as, for example, alkanes such as pentane or hexane, cycloalkanes such as cyclohexane, aromatic hydrocarbons such as benzene or toluene or halogenated hydrocarbons such as $CCl_4$ or $CHCl_3$ or mixtures of these hydrocarbons. Their use as antistatic agents for liquid fuels, such as petrol and kerosene, and for mineral oils, is of particular industrial interest.

The compounds are added to the substrates in concentrations of $10^{-2}$ to $10^{-6}$ mol/litre, preferably $10^{-3}$ to $10^{-4}$ mol/litre.

The compounds which can be manufactured according to the invention can also be used as PVC stabilisers, polymerisation catalysts or driers.

In the examples which follow, per cent denotes per cent by weight and "DIPS" denotes the anion of diisopropylsalicylic acid.

EXAMPLE 1

Preparation of Ni(DIPS)$_2$ 4.45 g of 3,5-diisopropylsalicylic acid ($2\times10^{-2}$ mol) are dissolved in 75 ml of analytical grade methanol. 2.38 g of NiCl$_2$.6H$_2$O ($10^{-2}$ mol) dissolved in 75 ml of methanol are added thereto. 200 ml of 0.1 N sodium methylate solution in methanol ($2\times10^{-2}$ mol) are subsequently added in portions, whilst stirring. The methanol is evaporated off and the residue is dissolved in 300 ml of benzene and cooled for 20 minutes at 0°C. The NaCl is filtered off and the benzene is evaporated off. The residue is dissolved in 100 ml of ether, the ether is distilled off on a rotary evaporator and the residue is dried at 95°C.

Gravimetric analysis: Found Ni 11.65%
Calculated 11.73%

If the NiCl$_2$.6H$_2$O is replaced by $10^{-2}$ mol of ZnCl$_2$, CuCl$_2$, MnCl$_2$, CaCl$_2$, VOCl$_2$ or ZrOCl$_2$ and in other respects the procedure described above is followed, the corresponding DIPS complexes are obtained. The gravimetric analysis gives the following values.

| | M, calculated (%) | M, found (%) |
|---|---|---|
| Zn complex | 12.88 | 12.82 |
| Cu complex | 12.53 | 13.50 |
| Mn complex | 11.05 | 10.60 |
| Ca complex | 8.32 | 7.78 |
| Be complex | 2.00 | 2.24 |
| VO complex | 10.00 | 10.60 |
| ZrO complex | 16.61 | 17.06 |

EXAMPLE 2

Manufacture of Ni(DIPS)(OH)

2.223 g of 3,5-diisopropylsalicylic acid ($10^{-2}$ mol) are dissolved in 75 ml of analytical grade methanol. 2.38 g of NiCl$_2$.6H$_2$O ($10^{-2}$ mol) dissolved in 75 ml of methanol are added thereto. 200 ml of 0.1 N sodium methylate solution in methanol ($2\times10^{-2}$ mol) are then added in portions, whilst stirring. The methanol is evaporated until the total solution volume has been reduced to approx. 1/6 and the residue is mixed with 300 ml of distilled H$_2$O. The aqueous suspension is extracted with 300 ml of benzene. The benzene phase is separated off and subsequently washed twice with 150 ml of distilled water at a time. After separating off the water, the benzene phase is dried with sodium sulphate and filtered off. The benzene is evaporated off. The residue is dissolved in 100 ml of ether, evaporated to dryness on a rotary evaporator and dried at 95°C.

Gravimetric analysis: Found, Ni 19.52%
Calculated 19.79%

If the NiCl$_2$.6H$_2$O is replaced by $10^{-2}$ mol of MnCl$_2$, BeCl$_2$, FeCl$_2$ or ZrOCl$_2$ and in other respects the procedure described above is followed, the corresponding hydroxyl complexes are obtained. The gravimetric analysis gives the following values:

| | M, calculated (%) | M, found (%) |
|---|---|---|
| Mn complex | 18.74 | 18.20 |
| Be complex | 3.64 | 4.14 |
| Fe complex | 18.99 | 13.30 |
| ZrO complex | 26.42 | 22.96 |

EXAMPLE 3

Binary mixtures of the indicated divalent metal complexes and of the compound of the formula

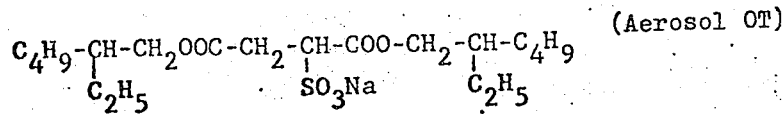

(Aerosol OT)

in benzene were manufactured, under the concentration conditions indicated in the table which follows. The specific conductivities ($[\Omega^{-1}\text{cm}^{-1}]$) of the solutions were determined at $20 \pm 0.01°C$.

| Metal-(II) diisopropyl-salicylate $10^{-4}$ mol. litre $^{-1}$ | Aerosol OT (mol. litre$^{-1}$) | | | | |
| --- | --- | --- | --- | --- | --- |
| | $10^{-5}$ | $10^{-6}$ | $10^{-7}$ | $10^{-8}$ | 0 |
| | $\chi[\Omega^{-1}\text{cm}^{-1}]$ | | | | |
| Ni(DIPS)$_2$ | 5.28×10$^{-12}$ | 6.7×10$^{-13}$ | 7.45×10$^{-13}$ | 7.6×10$^{-13}$ | 8.0×10$^{-13}$ |
| Ni(OH).DIPS | 2.24×10$^{-11}$ | 1.73×10$^{-12}$ | 1.73×10$^{-12}$ | 2.16×10$^{-12}$ | 2.31×10$^{-12}$ |
| Zn(OH).DIPS | 5.18×10$^{-11}$ | 1.05×10$^{-12}$ | 1.14×10$^{-12}$ | 1.14×10$^{-12}$ | 9.15×10$^{-13}$ |

What we claim is:

1. Process for the manufacture of metal complexes of divalent metals or oxo complexes of tetravalent metals with the acids of the formula I

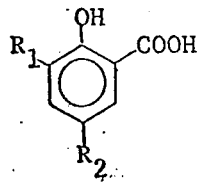 (I)

in which $R_1$ and $R_2$ independently of one another denote hydrogen, bromine, chlorine, alkyl, cycloalkyl or aralkyl, characterised in that a successive reaction is carried out, in a solvent, of
  a. an acid of the formula I with
  b. a salt of the formula II

in which M denotes the divalent cation of a divalent metal or of an oxo complex of a tetravalent metal, X denotes an anion which forms with M a salt which is soluble in the solvent of the process and p denotes 1 or 3 and m corresponds to the valency of the anion X, and
  c. an alcoholate of the formula III
     M'OR (III)
in which M' denotes the cation of an alkali metal and R denotes lower alkyl, the methoxyethyl group or the ethoxyethyl group, a, b and c are employed in the molar ratio of (2-i): 1/p:2 and i denotes 1 or 0 and, in the case that i is 1, the reaction mixture is reacted with water, the molar ratio of water to the acid of the formula I being at least 1.

2. Process according to claim 1, characterised in that a reaction is carried out in a lower alcohol, a lower ether, a lower ether-alcohol, a lower ketone or dimethylformamide, of
  a. an acid of the formula I with
  b. a salt of the formula II

in which M denotes the divalent cation of Be, Ca, Sr, Ba, Mg, Mn, Fe, Co, Ni, Cu, VO or ZrO, X denotes the anion Cl$^-$, Br$^-$, F$^-$, NO$_3^-$, SO$_4^{--}$, ClO$_4^-$, CH$_3$COO$^-$, or C$_{17}$H$_{35}$COO$^-$ and m corresponds to the valency of the anion X, and
  c. an alcoholate of the formula III
     M'OR (III)
in which M' denotes the cation of an alkali metal and R denotes lower alkyl, the methoxyethyl group or the ethoxyethyl groups, a, b and c are employed in the molar ratio of (2-i): 1:2 and i denotes 1 or 0 and, if i is 1, the reaction mixture is reacted with water, the molar ratio of water to the acid of the formula I being at least 1.

3. Process according to claim 1, characterised in that an acid of the formula I is reacted, in which $R_1$ and $R_2$ independently of one another denote hydrogen or alkyl with a total of 1 to 10 carbon atoms, cycloalkyl with 6 to 9 carbon atoms or aralkyl with 7 to 9 carbon atoms, 4. Process according to claim 1, characterised in that a salt of the formula II in which X denotes Cl$^-$ or CH$_3$COO$^-$ is used.

* * * * *